United States Patent
de Almeida et al.

(10) Patent No.: US 10,358,117 B2
(45) Date of Patent: Jul. 23, 2019

(54) APPARATUS FOR CONTROLLING OR OTHERWISE MANIPULATING VEHICLE COMPONENTS, AND METHODS OF USE AND MANUFACTURE THEREOF

(71) Applicant: Honda Motor Co., Ltd., Tokyo (JP)

(72) Inventors: Erik F. de Almeida, Dublin, OH (US); Michael T. Binfet, Bellefontaine, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 15/040,658

(22) Filed: Feb. 10, 2016

(65) Prior Publication Data

US 2017/0225654 A1 Aug. 10, 2017

(51) Int. Cl.
*B60S 1/04* (2006.01)
*B60S 1/08* (2006.01)

(52) U.S. Cl.
CPC ........... *B60S 1/0896* (2013.01); *B60S 1/0452* (2013.01)

(58) Field of Classification Search
None
See application file for complete search history.

(56) References Cited

U.S. PATENT DOCUMENTS 4,373,130 A * 2/1983 Krasborn .......... B32B 17/10036
219/203
4,866,359 A 9/1989 Schmid et al.
5,769,752 A 6/1998 Kim
5,867,000 A 2/1999 Thornton
6,023,107 A 2/2000 Grass
8,327,497 B2 12/2012 Cox et al.
2008/0100246 A1* 5/2008 Kim .......... B60S 1/08
318/443
2014/0210382 A1* 7/2014 Willey .......... B60S 1/0452
318/286

FOREIGN PATENT DOCUMENTS

DE 3627561 C1 * 10/1987 ........... B60S 1/0402
JP 2008174026 A * 7/2008

OTHER PUBLICATIONS

"NAPA Know How: Wiper Blade Replacement" http://www.napaonline.com/KnowHow/wiper-blades-replacement.aspx.

* cited by examiner

*Primary Examiner* — Abby Y Lin
*Assistant Examiner* — Kelly D Williams
(74) *Attorney, Agent, or Firm* — Kenealy Vaidya LLP (57) ABSTRACT

A control system can include an actuator actuable into an on state to instruct a wiper motor to move a wiper over a vehicle exterior surface, and a source of vehicle movement data that indicates whether the vehicle is moving. A processor based controller can instruct the wiper motor to move the wiper to either a Park 1 position that provides enhanced aerodynamic effects or a different Park 2 position that provides enhanced accessibility to the wiper if the actuator is not actuated into the on state. The controller being specifically configured to instruct the wiper motor to move the wiper to the Park 1 position if the source of vehicle information indicates that the vehicle is moving, and to instruct the wiper motor to move the wiper to the Park 2 position if the source of vehicle information does not indicate that the vehicle is moving.

18 Claims, 4 Drawing Sheets

APPARATUS FOR CONTROLLING OR OTHERWISE MANIPULATING VEHICLE COMPONENTS, AND METHODS OF USE AND MANUFACTURE THEREOF

BACKGROUND

The disclosed subject matter relates to apparatus for controlling or otherwise manipulating vehicle components, and methods of use and manufacture thereof. More particularly, the disclosed subject matter relates to wipers, wiper assemblies, mechanical and electronic wiper controllers, methods of controlling wipers and wiper assemblies, and methods of manufacturing any of the above apparatus.

Vehicles can be provided with various apparatus for removing or otherwise moving certain physical objects (such as liquids, solids, etc.) from certain vehicle surfaces, such as vehicle exterior surfaces. These physical objects can include water (e.g., rain), snow, sleet, fog, mist, leaves, debris, etc. Apparatus (such as wiper assemblies, wiper blades, etc.) can be provided to physically contact these objects to achieve this removal. In some cases, these apparatus move or otherwise remove objects from exterior windows (e.g., front windshield, rear windshield, etc.), exterior surfaces of lights (e.g., headlights, fog lights, etc.), etc. This removal can be performed for a variety of reasons, such as to enhance vehicle occupants' view through the window, enhance light transmission to the vehicle exterior, enhance the vehicle's aesthetics, appearance, etc.

SUMMARY

Wiper assemblies, wiper blades, etc., such as those that are controllable by a vehicle occupant, can be used to perform the above operations. In some cases, the wiper blades are configured to adopt a repeating motion across the vehicle surface at issue so as to physically contact and thereby move these objects. It may be beneficial that the wiper blades be configured and/or controlled to provide a large contact surface to enhance this operation, i.e., to cover a large area of the vehicle exterior surface.

Some wiper blades can be attached to a vehicle body so as to secure the wiper blade (such as at its base), while also enabling the wiper blade to travel across the exterior surface at issue. In some cases, this travel includes a sweeping movement, such as in an arcuate or semi-arcuate direction, although linear movement may also be appropriate in certain circumstances.

Wiper blades and/or other elements of the wiper assemblies can be parked or docked, such as in a certain location and/or orientation, when not in use, i.e., when they are not engaged in contacting objects on the vehicle exterior surface. This parking may be beneficial for a variety of reasons. For example, the wiper blades, etc., can be parked at a location and in an orientation so that a vehicle occupant's view through a window (e.g., front or rear windshield) is not obstructed, or to reduce any such visual obstruction. This parked location, orientation, etc., can also enhance vehicle aerodynamic characteristics, as well as vehicle noise, vibration and harshness (NVH) aspects, which can be beneficial for a variety of reasons, such as to enhance fuel consumption, enhance vehicle performance, etc. The parked location, orientation, etc., can also enhance wear, durability, etc., of the wipers, wiper assemblies, etc., such as by reducing or impeding exposure to environmental conditions, etc. Disposing the wipers, wiper assemblies, etc., in a parked position can also enhance the vehicle's aesthetic appearance, and may even enhance removability of debris (such as snow, ice, leaves, etc.) from a base of the windshield.

Many or all of the above advantages can be achieved by disposing and/or orienting the wipers in a parked position, where the blades and/or other wiper components are disposed or otherwise retracted to a location that shields at least a portion of their structure from aerodynamic effects, environmental conditions, etc. For example, the wiper blades, etc., can at least partially be disposed in a recess defined between an end of the vehicle hood adjacent the passenger compartment and a base of the front windshield.

However, adopting the parked position, wherein the wiper blades, components, etc., are retracted as disclosed above, may impede certain servicing operations, such as servicing, replacing, etc. these components. For example, the wiper blades, etc., can be difficult to manually access in the retracted position by virtue of their disposition in a relatively narrow space, i.e., in the recess between the hood and windshield. In addition, debris (such as snow, ice, leaves, etc.) may obstruct access to the wiper blades, components, etc., such as where debris is disposed on top of the wiper blades, components, etc., i.e., between the wiper blades, components, etc. and the person attempting to access the wiper blades, components, etc.

It may therefore be beneficial to provide methods and apparatus that enable wiper blades, components, etc., to adopt a parked position while not in use, such as to achieve any or all of the advantages disclosed above, while also addressing any or all of the servicing issues disclosed above. In other words, it may be beneficial to park the wiper blades, components, etc., to achieve these advantages, but to enhance or simplify servicing of the wiper blades, components, etc., such as by making the wiper blades, components, etc. more accessible. It may also be beneficial to implement these methods and apparatus in a way that reduces wiper assembly complexity, enhances or simplifies usability and/or operability, enhances reliability of wiper operations, etc.

In some embodiments, the wiper blades, components etc., can adopt a parked position when not in use, such as where the wiper blades, etc., or a portion thereof are disposed in a recess or a recessed cavity to achieve some or all of the advantages disclosed above. The wiper blades may also have the ability to adopt another position when not in use (such as a service position) that is different from the parked position, and which facilitates servicing of the wiper blades, components, etc. The wiper blades, components, etc., may at least partially be disposed outside of the above recessed cavity when in the service position, which will allow them to be more easily accessible for servicing, replacement, etc.

Embodiments are intended to include or otherwise cover any methods and apparatus for performing the above operations, i.e., maneuvering wiper blades, components, etc., into one of the two different positions (parked position and servicing position) when not in use. For example, some embodiments enable a user, such as a vehicle operator, to manually actuate the wiper blades, components, etc., into either of these positions. Alternatively, some embodiments automatically maneuver the wiper blades, components, etc., into these positions when not in use. This automatic actuation can be based on one or multiple factors, such as but not limited to ignition status, gear status, vehicle speed, etc. Some other embodiments enable the wiper blades, components, etc., to be actuated into the parked and service positions both manually and automatically.

Some embodiments are therefore directed to a control system for use with a wiper motor that is configured to move a wiper over a vehicle exterior surface for the purpose of contacting and thereby moving an object disposed thereon. The control system can include an actuator that is actuable into an on state such that the actuator instructs the wiper motor to move the wiper over the exterior surface, and a source of vehicle movement data that indicates whether the vehicle is moving. A processor based controller can instruct the wiper motor to move the wiper to either a Park 1 position that provides enhanced aerodynamic effects, or a different Park 2 position that provides enhanced accessibility to the wiper if the actuator is not actuated into the on state. The controller being configured to instruct the wiper motor to move the wiper to the Park 1 position if the source of vehicle information indicates that the vehicle is moving, the controller also being configured to instruct the wiper motor to move the wiper to the Park 2 position if the source of vehicle information does not indicate that the vehicle is moving.

Some other embodiments are directed to a vehicle wiper assembly that is configured to contact and thereby move an object disposed on an exterior surface of a vehicle. The vehicle wiper assembly can include a wiper configured to be disposed in contact with the vehicle exterior surface, a wiper motor that is configured to move the wiper over the vehicle exterior surface, and a control system for providing instructions to the wiper motor to direct movement of the wiper.

The control system can include an actuator that is actuable into an on state such that the actuator instructs the wiper motor to move the wiper over the exterior surface, a source of vehicle movement data that indicates whether the vehicle is moving, and a processor based controller that instructs the wiper motor to move the wiper to either a Park 1 position that provides enhanced aerodynamic effects or a different Park 2 position that provides enhanced accessibility to the wiper if the actuator is not actuated into the on state. The controller can be configured to instruct the wiper motor to move the wiper to the Park 1 position if the source of vehicle information indicates that the vehicle is moving. The controller can also be configured to instruct the wiper motor to move the wiper to the Park 2 position if the source of vehicle information does not indicate that the vehicle is moving.

Still other embodiments are directed to a method of controlling a wiper motor that is configured to move a wiper over a vehicle exterior surface for the purpose of contacting and thereby moving an object disposed thereon. The method can include: instructing the wiper motor to move the wiper to either a Park 1 position that provides enhanced aerodynamic effects, or a different Park 2 position that provides enhanced accessibility to the wiper, if an actuator is not actuated into the an state that would otherwise instruct the wiper motor to move the wiper over the exterior surface; instructing the wiper motor to move the wiper to the Park 1 position if a source of vehicle information indicates that the vehicle is moving; and instructing the wiper motor to move the wiper to the Park 2 position if the source of vehicle information does not indicate that the vehicle is moving.

BRIEF DESCRIPTION OF THE DRAWINGS

The disclosed subject matter of the present application will now be described in more detail with reference to exemplary embodiments of the apparatus, assembly, and method, given by way of example, and with reference to the accompanying drawings, in which.

DETAILED DESCRIPTION OF EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Aerodynamic Forces

As discussed above, wipers can affect aerodynamic characteristics of the vehicle, and thus can be disposed in a recess between the vehicle hood and windshield base to enhance aerodynamic characteristics. A few aspects of these aerodynamic characteristics that are relevant to vehicle wiper positioning are discussed below for exemplary purposes.

The pressure distribution over a body's surface can exert "normal" forces which, once summed and projected into a freestream direction, represent the drag force due to pressure $D_{pr}$. The nature of these normal forces combines together shock wave effects, vortex system generation effects and wake viscous mechanisms.

When the viscosity effect over the pressure distribution is considered separately, the remaining drag force is referred to as "pressure" (or "form") drag. In the absence of viscosity, the pressure forces on a vehicle can cancel each other out, and hence, the drag is zero. Pressure drag is the dominant component in the case of vehicles with regions of separated flow, in which the pressure recovery is fairly ineffective.

The friction drag force, which is a tangential force on a vehicle surface, depends substantially on boundary layer configuration and viscosity. The calculated friction drag $D_f$ can utilize the "x-projection" of the viscous stress tensor evaluated on each discretized portion of the body's surface.

The sum of friction drag and pressure (form) drag is referred to as viscous drag. This drag component also takes into account the influence of viscosity. From a thermodynamic perspective, viscous effects represent irreversible phenomena, and therefore these viscous effects can create entropy. The calculated viscous drag $D_v$ uses entropy changes to accurately predict the drag force.

Yet another form of aerodynamic drag is referred to as induced drag. When a vehicle, such as an airplane, produces lift, the induced drag, symbolized by $D_i$, is created due to a modification on the pressure distribution due to a trailing vortex system that accompanies the lift production. Induced drag tends to be the most important component for airplanes during take-off or landing.

Still another form of aerodynamic drag is referred to as wave drag $D_w$. Wave drag is created from shock waves in transonic and supersonic speeds. The shock waves induce changes in the boundary layer and pressure distribution over the surface of the body of the vehicle. Not only viscous effects, but also shock waves, can induce irreversible phenomena, and as a consequence, can be measured through entropy changes along the domain as well.

II. Overall Vehicle

Figure 1:
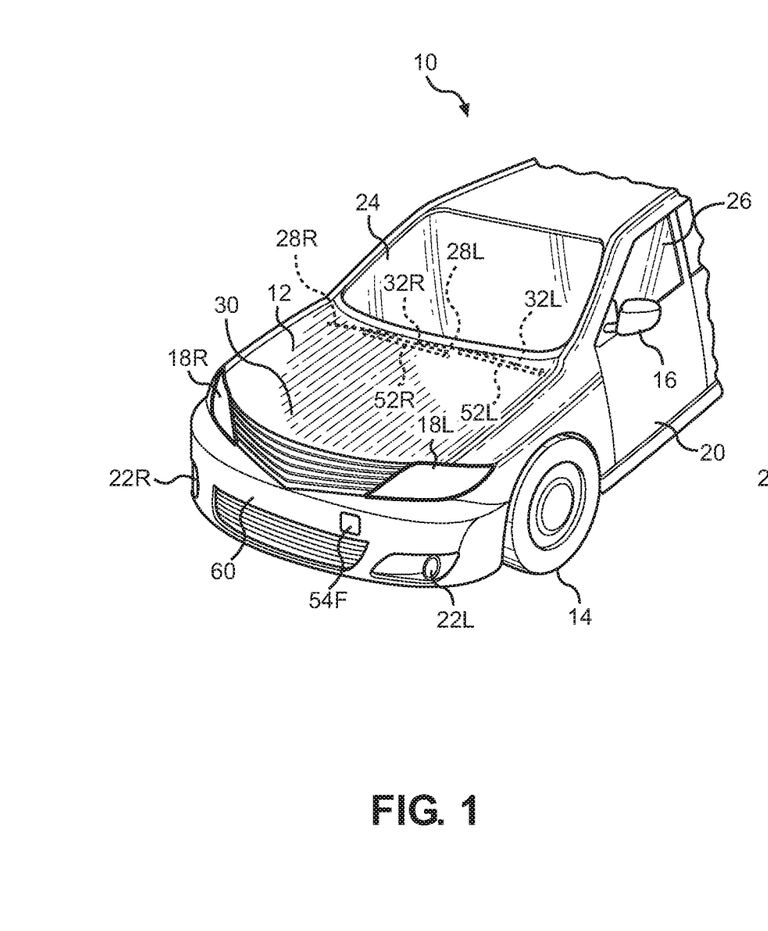
FIG. 1 is a perspective view of an exemplary vehicle with wipers disposed in a parked position (Park 1) in accordance with the disclosed subject matter.
Figure 2:
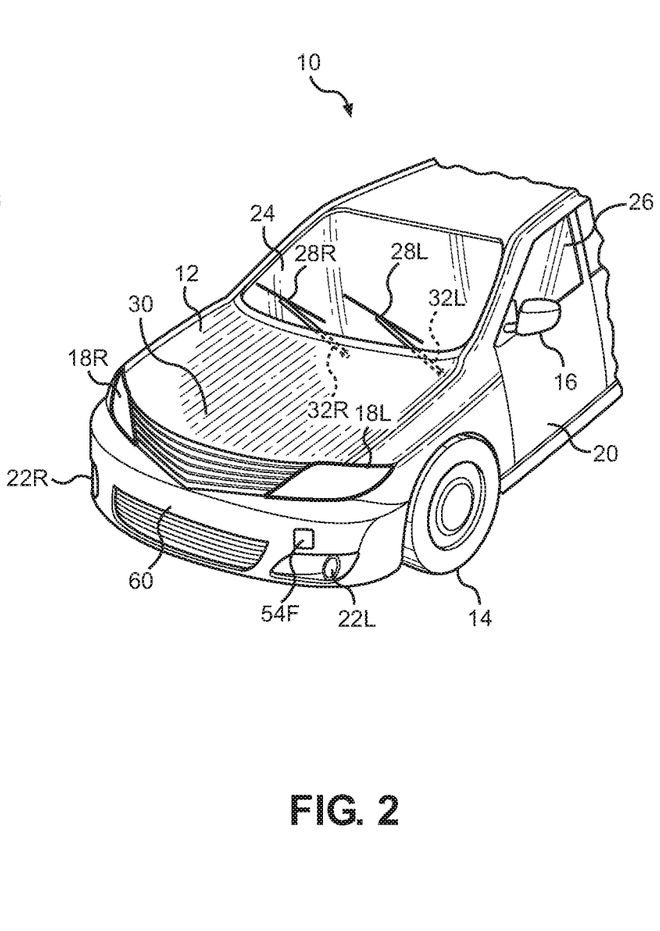
FIG. 2 is a perspective view of the exemplary vehicle of FIG. 1, with wipers disposed in a service position (Park 2) in accordance with the disclosed subject matter.

FIGS. 1 and 2 are perspective views of an exemplary vehicle with wipers disposed in a parked position (Park 1), and a service position (Park 2), respectively, when not in use. More particularly, FIG. 1 depicts the vehicle 10 with wipers 28R and 28L parked (or docked) in vehicle recesses 32R and 32L in the parked position (Park 1), while FIG. 2 depicts the wiper blades 28R and 28L disposed in the service position (Park 2) allowing access to the wiper blades 28R and 28L such as for servicing.

FIGS. 1 and 2 specifically illustrate an exemplary vehicle 10 including a vehicle body 12, left front wheel 14, left front door 20, driver side window 26, left rear view mirror 16, front headlights 18R and 18L, running lights 22R and 22L, parking sensor(s) 54F, windshield 24, vehicle hood 30, and vehicle fender 60. FIGS. 1 and 2 also show wipers 28R, 28L, vehicle recesses 32R, 32L in which the wipers 28R, 28L can be disposed (such as in the Park 1 position), and vehicle recess lids 52R and 52L, which may cover or otherwise protect tops of the wiper blades 28R and 28L in the Park 1 position. These features are merely shown for exemplary purposes, and embodiments are intended to be applicable to any type of vehicle.

Vehicles can be equipped with windshields 24 for a variety of reasons. A number of factors, such as fuel consumption constraints, cost, efficiency, attractiveness, etc., make it beneficial to design these windshields 24 to be as aerodynamically efficient as possible, such that air, moisture, rain or snow, etc., flow freely over the contours of the vehicle body 12 including the windshield 24. The windshield 24 may further be fabricated in a manner so as to be contiguous with the frame of the vehicle body 12, and more particularly with the vehicle hood 30 and vehicle roof, for enhanced aerodynamic efficiency and stylized attractiveness to a consumer.

However, the windshield 24 also provides a surface on which external environmental elements may adhere. Each of these elements may obscure visibility through the surface of the windshield 24. Vehicles can therefore be equipped with wipers 28R and 28L, which are operable to contact and thereby move objects disposed on the windshield 24 exterior. In the following disclosure, various components of the wiper assemblies are generally referred to as the wipers 28R, 28L for simplicity. These wiper components include a wiper arm that holds a wiper blade, which itself contacts the vehicle exterior surface. In some cases, these components also include a lever or other apparatus that connects the wiper arm to a motor or other mechanism for powering movement of the wiper arm and blade (which as discussed above are generally referred to herein as wipers 28R, 28L). Still further, vehicle recess lids 52R, 52L can cover a tip surface of some of these components.

The wipers 28R and 28L may swipe across the exterior surface of the vehicle's 10 windshield 24 at a predetermined or programmable interval, which may be adjustable by the vehicle operator, and these intervals may vary depending on environmental conditions, such as rate of precipitation (i.e., rate of rainfall, for example). The wipers 28R and 28L may also be configured to move together, such as in tandem motion (as is common in North American vehicles) where both wipers 28R and 28L travel in the same direction at any given time, or in anti-parallel motion (as is common in European vehicles) where the motion of the wipers 28R and 28L tend to oppose each other.

The wipers 28R and 28L can perform these movements at a faster or slower rate, and may further perform these movements sporadically (aperiodically), or just once, such as upon manual actuation by the vehicle operator. This function may be executed by: 1) manually actuating a windshield wiping control actuator, which may be in the form of a bar, knob, button, etc., 2) automatically actuating the wipers based on a signal from the vehicle, or 3) any other action causing the wipers 28R and 28L to perform their intended function.

FIGS. 1 and 2 show wipers 28R, 28L disposed at the front windshield 24. However, embodiments, include or otherwise cover disposing similar or different types of wipers 28R, 28L at different locations, such as on the vehicle's rear windshield (not shown), which may permit enhanced visibility of objects, obstacles, pedestrians, etc. located behind the vehicle, assist the vehicle's operator to accurately judge the velocity and direction of oncoming vehicles behind the vehicle 10 during normal operation, etc.

Wipers 28R and 28L may also be disposed in locations other than the front and rear windshields, such as on the front headlights 18R and 18L, running lights 22R and 22L, or rear lights of the vehicle (not shown). Wipers 28R and 28L may move or otherwise remove objects disposed on the headlights 18R and 18L, taillights, running lights 22R and 22L, brake lights, etc. that may obscure the light projected thereby. Wipers 28R, 28L may further be disposed anywhere on the body 12 of the vehicle 10, including on a vehicle sunroof, passenger side windows, or anywhere else where it is deemed desirable to move or otherwise remove material from the vehicle surface, such as precipitation including rain, snow, sleet, hail, dust or mud, leaves, pollen, etc.

Wipers 28R, 28L may create a surface irregularity to the contour of the windshield 24 and/or vehicle body 12, because the wipers 28R and 28L generally protrude from the vehicle 10 contour (such as windshield 24 or vehicle body 12), and hence may impede the aerodynamic flow of air, water, sleet, snow, leaves, sand, or any environmental element across the vehicle surface. Protrusions of this type may result in aerodynamic drag or other complications to the vehicle's aerodynamic quantities, e.g., compressible flow, turbulence or boundary layers of elements attempting to pass or, under or around the vehicle 10.

A further drawback of aerodynamic resistance caused by wipers 28R, 28L may involve increased sound in the vehicle 10, or noise apparent to neighboring vehicles, which may be distracting or irritating to the vehicle operator or neighboring vehicle operators. Noise can create an audible or psychological road hazard. The aerodynamic resistance can also impact the fuel economy of the vehicle 10, since the irregularity may tend to disrupt the desired flow of air, moisture, or other environmental elements around the vehicle 10, because more energy is required to fight the resistance of the external atmosphere, which in turn may require a greater expenditure of fuel to accommodate these losses.

Some wiper systems may park the wipers 28R and 28L when not in use in locations designed to provide enhanced aerodynamic performance, such as by reducing the aerodynamic resistance of the vehicle 10 to the various environmental elements while the vehicle 10 is in motion. In some embodiments, the wipers 28R and 28L may be parked (or docked) in vehicle recesses 32R and 32L, such as in a recess defined partially between an end of the hood 30 and a base of the windshield 24.

FIG. 1 depicts the wipers 28R and 28L parked in this recess, which is hereinafter referred to as position Park 1 (or the parked position). The wipers 28R and 28L may be parked in position Park 1 (a dynamic position designed to reduce the aerodynamic drag to the vehicle) while the vehicle is in motion and the blades are not in use. While in this position, the wipers 28R, 28L or portions thereof may be disposed in or under the vehicle hood 30, or in or behind any recess or barrier that reduces the cross-sectional area of the wipers 28R and 28L to the environmental elements flowing around the vehicle. The wipers 28R, 28L may also be disposed under an aerodynamically preferable obstruction on the vehicle hood 30, or in any other formation that reduces the aerodynamic drag of the vehicle. For example, the wipers 28R and 28L may be parked in the Park 1 position under an aerodynamically preferable shield on the surface of the vehicle hood 30, rather than in a recess under the vehicle hood 30. However, embodiments are intended to cover or otherwise include any aerodynamically preferable dynamic position of the wipers 28R and 28L, which is to be adopted when the vehicle is in motion but the wipers 28R and 28L are not in a state of operation, which as indicated above is referred to herein as the Park 1 position.

However, these more aerodynamically efficient parking positions (Park 1 position) can impede the ability of a vehicle operator, technician, etc., to physically access the wipers 28R, 28L for purposes of maintenance, repair, etc. For example, the wipers 28R, 28L may be difficult to manually access when disposed in recessed cavities 32R and 32L. This problem arises because the parking configurations (Park 1 position) have been purposefully chosen to offer a smaller material cross-section, making them less physically accessible. In other words, these alternative positions can add aerodynamic value to the vehicle and lessen fuel costs (because the wipers 28R, 28L are less exposed to the environmental elements during the vehicle operation), but the blade maintenance, replacement, etc. is more complicated based on inaccessibility of the wipers 28R, 28L (or components thereof, such as the blades). Maintenance tasks may include replacing the wipers 28R, 28L, accessing the wiper blade assembly, including the wiper blade motor or connecting assembly, etc.

However, the present embodiments address this issue by providing a second position for the wipers 28R, 28L when not in use, i.e., the service position (Park 2), which provides more accessibility to the wipers 28R, 28L. This Park 2 position is shown in FIG. 2. The Park 1 position (wherein the wipers 28R, 28L are disposed within recesses, etc.) is adopted under certain circumstances, such as when the vehicle is moving or likely to move, which provides the aerodynamic benefits discussed above. Contrarily, the service position (Park 2) disposes the wipers 28R, 28L in a more accessible location when the vehicle is not moving or likely to move. Exposing the wipers 28R, 28L in this manner does not create an aerodynamic penalty because the Park 2 position is adopted when the vehicle is not moving or likely to move. Embodiments are intended to cover or otherwise include any Park 2 position of the wipers 28R, 28L that provides this enhanced access.

Embodiments are intended to include or otherwise cover any control methods or apparatus for maneuvering the wipers 28R, 28L into either of the Park 1 or Park 2 positions. Embodiments are also intended to include or otherwise cover all methodologies for determining whether it would be appropriate for the wipers 28R, 28L to be in either the Park 1 or Park 2 positions when not in use, including both manual and automatic methodologies. Some of these control methods and apparatus are discussed below for exemplary purposes.

III. Wiper Control Module

Figure 3:
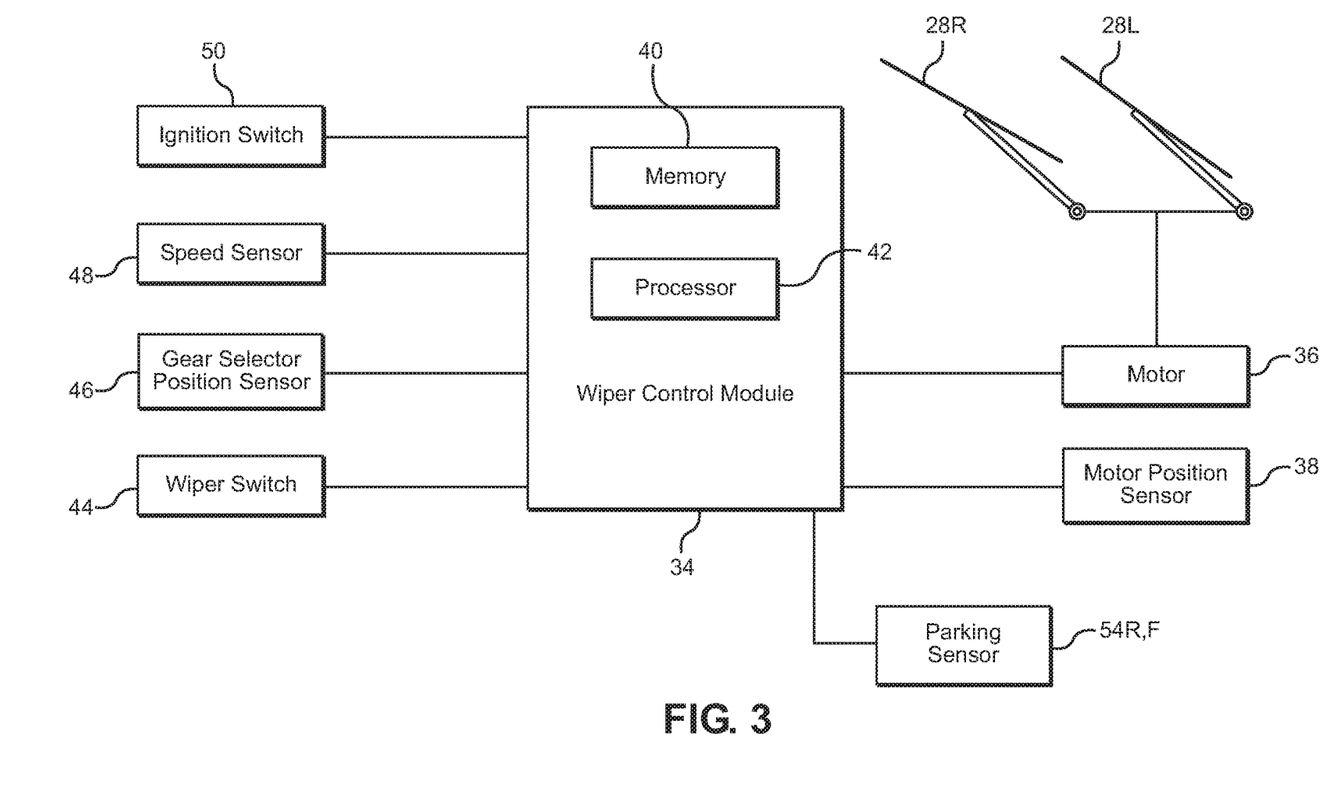
FIG. 3 is a schematic of various components of the disclosed system including wipers, wiper motor, wiper control module, motion position sensor, ignition and wiper switches, and speed and gear position sensors.

FIG. 3 is a schematic of various components of the disclosed system including wipers, wiper motor, wiper control module, motion position sensor, ignition and wiper switches, and speed and gear position sensors. Each of these features is discussed below.

The wiper control module 34 shown in FIG. 3 includes a wiper control module memory 40 and a wiper control module processor 42. The wiper control module 34 may be either a digital or an analog computational device capable of receiving input information from vehicle components, and using the information to make a decision as to which of the two positions (Park 1 or Park 2) to park the wipers 28R and 28L. Of course, the wiper control module 34 may also be programmed to park in more positions than two, such as detaching the wipers 28R, 28L (or components thereof) from the windshield entirely, or splaying the blades such as to facilitate cleaning the windshield 24.

The wiper control module 34 is capable of receiving data from numerous sources. Some possible sources of input information include the motor position sensor 38, the wiper switch 44, the gear selector position sensor 46, the parking sensor 54F (rear sensor not shown), the speed sensor 48, the ignition switch 50, and the wiper motor 36. The wiper control module 34 can draw on each of these sources of input information to perform a calculation as to whether or not the vehicle is in motion, and thus whether the wipers 28R, 28L should be parked in the park position (Park 1), or the service position (Park 2).

The wiper control module 34 is able to perform these calculations by utilizing the wiper control module processor 42 in conjunction with the wiper control module memory 40. The wiper control module memory 40 may store any information in the form of dynamic memory (such as random access memory, which is often lost when the power is shut off). The wiper control module memory 40 may also contain read-only memory (ROM), which enables storage of information that is not lost when the vehicle 10 loses power and which cannot be overwritten. Finally, the wiper control module memory 40 may have some form of rewritable memory, allowing it to store software (such as codes or algorithms) that are not overridden when the vehicle loses power. This form of memory may be desirable to enable the instantaneous or current states of the various vehicle components to be stored in the wiper control module memory 40 once the vehicle is powered down. These states may then be ascertained during the subsequent restoration of power to vehicle 10. Finally, rewritable memory can be capable of being re-programmed and/or updated. This feature can be very useful because a vehicle manufacturer may update the operating system responsible for driving the wiper control module 34, or may also update other software. Decision algorithms used in vehicle 10 may be updated in favor of faster or more sophisticated codes. In addition, new codes may be added to incorporate different sources of input information not depicted in FIG. 3, such as a door sensor that provides information as to the state of the driver side door (open or closed), trunk, etc.

Interaction between the wiper control module 34 and the vehicle components may entail a unidirectional exchange of information from the vehicle component to the wiper control module 34. For example, it is unlikely that the wiper control module 34 would control the ignition switch 50. Instead, the ignition switch 50 would likely provide a one-way path of information to the wiper control module 34. However, other embodiments do not operate based solely on this unidirectional exchange of information, and instead include elements that operate pursuant to a bi-directional exchange of information.

As indicated above, the wiper control module 34 determines whether to move the wipers 28R, 28L to one of the park or service positions (Park 1 or Park 2), and if so which of these position, based on information received from various sources. For example, if the wiper control module 34 receives information indicating that the wipers 28R, 28L are in use, then it decides to not move wipers 28R, 28L into either of the Park 1 or Park 2 positions. Contrarily, if the wipers 28R, 28L are not in use, then the wiper control module 34 decides whether to move the wipers 28R, 28L to either the Park 1 position or the Park 2 position.

This decision is made at least in part based on whether the vehicle 10 is moving or likely to move. For example, the Park 1 position is more appropriate if the vehicle 10 is moving (or likely to move) to achieve aerodynamic advantages from that position. Contrarily, the Park 2 position is more appropriate if the vehicle 10 is not moving (or unlikely to move) to obtain advantages of enhanced accessibility to the wipers 28R, 28L. Thus, the type of information received by the wiper control module 34 is designed to enable it to make a decision as to whether the vehicle 10 is either moving or likely to move. As indicated above, the information disclosed herein is merely provided for exemplary purposes, and embodiments are intended to include or otherwise cover any type of information that may be relevant to making this decision.

Embodiments are also intended to include or otherwise cover any methodologies used by the wiper control module 34 to determine whether the vehicle 10 is moving or likely to move. Some methodologies can be designed to enhance accuracy of this determination, while others can focus more on simplicity. The various methodologies may be based on the type of information received, and/or may weight the information.

For example, some embodiments may rely solely on information indicating ignition status (state of vehicle engine ignition), such as data received from the ignition switch 50. For example, assuming that the wipers 28R, 28L are not in use, the wiper control module 34 can determine whether the wipers 28R, 28L should be in the Park 1 or Park 2 position based solely on whether the ignition switch 50 indicates that the engine is either on or off.

At least two different embodiments rely solely on information indicating vehicle engine ignition. In one embodiment, the wiper control module 34 automatically determines that the wipers 28R, 28L should be in the Park 1 position if the vehicle engine ignition is off, regardless of any data relating to vehicle movement. This embodiment is beneficial because the wipers 28R, 28L are maintained in the Park 1 position whenever the engine is off, which may facilitate removal of debris that may settle thereon over extended periods. For example, disposing the wipers 28R, 28L in the recess may make it easier to remove snow, ice, etc. that forms or otherwise covers the windshield, tops of the wipers 28R, 28L, etc.

In a different embodiment, the wiper control module 34 automatically determines that the wipers 28R, 28L should be in the Park 2 position if the vehicle engine ignition is off, regardless of any data relating to vehicle movement. This embodiment may be beneficial because it provides access to the wipers 28R, 28L in the Park 2 position whenever the engine is off, and thus the wipers 28R, 28L can be accessed by merely turning off the vehicle engine.

However, for both of these embodiments, and as discussed in much more detail in the following sections, if the vehicle ignition is on, the wiper control module 34 can determine the proper wiper 28R, 28L position (Park 1 or Park 2) based on multiple inputs, i.e., sources of data relating to multiple different aspects of the vehicle 10. Various algorithms can be used to determine the methodologies of using the multiple different types of information. For example, some embodiments weight the information to provide relatively more weight to certain information. Other embodiments prioritize certain types of information, such as by hierarchically ordering the information. This ordering can be beneficial in various respects, such as to enhance accuracy, simplicity, etc.

For example, information regarding vehicle speed may supersede other information, such as ignition status, gear status, etc. In other words, it can be assumed that the vehicle engine is on and the transmission is in an operational gear (drive, reverse, etc.) upon determining that the vehicle is moving. The wiper control module 34 can therefore merely rely on the vehicle speed data to place the wipers 28R, 28L in the proper position. This operation enables the wiper control module 34 to make fewer decisions. Still further, determining that the engine ignition status is off precludes determining the engine speed, gear selection, etc., and the wiper control module 34 can place the wipers 28R, 28L in the proper position without further input.

The wiper control module 34 can also be configured to transmit information to vehicle components, such as to instruct the wiper motor 36 to physically control and move the wipers 28R, 28L. For example, the wiper control module 34 can instruct the wiper motor 36 to actuate the wipers 28R and 28L, to actuate the wipers 28R, 28L at a faster rate, to sporadically actuate the wipers 28R and 28L, etc. The wiper control module 34 may also instruct the wiper motor 36 to move the wipers 28R, 28L into either the Park 1 position or the Park 2 position, such as based on the methodologies discussed above.

In addition, the wiper control module 34 may engage in half-duplex or full-duplex communication and/or control with any other vehicle component, whereby these modules and components may exchange information with or control each other based on software, hardware or mechanical systems employed in either module/component. For example, the wiper control module 34 may use input information to control the vehicle motor 36 to actuate the wipers 28R, 28L. However, the wiper control module 34 may also receive information from the vehicle motor 36 to make a determination as to the current position of the wipers 28R, 28L, which may be used in a variety of ways, such as to initiate a sequence that opens or closes vehicle recess lids 52R and 52L. The information acquired from the vehicle components may be stored in the wiper control module memory 40.

IV. Wiper Control Module Operation

Some of the sources of information on which the vehicle control module 34 bases its determinations (such as whether to move the wipers 28R, 28L to either the Park 1 or Park 2 positions, and if so which position) are disclosed below for exemplary purposes. The following sensors are disclosed as providing information to the wiper control module 34: ignition switch 50, parking sensor 54R,F, speed sensor 48, motor position sensor 38, gear selector position sensor 46, and the wiper switch 44.

However, these sources of information are merely provided for exemplary purposes, and embodiments are intended to include or otherwise cover usage of any one or more of these sources of information, as well as usage of none of these sources of information. In other words, embodiments are intended to include or otherwise cover making these wiper position determinations based on relevant data, and in fact even cover making and implementing these determinations manually.

A. Ignition Switch

The vehicle ignition switch 50 activates the main electrical systems for the vehicle 10. In addition to providing power to a starter solenoid and the ignition system components (including the engine control unit and ignition coil), the vehicle ignition switch 50 switches on power to many "accessories", such as to the radio, power windows, etc. The ignition switch 50 may require a physical key to be inserted that mates with a lock built into the switch mechanism to turn or otherwise activate the switch, but can also be activated with a wireless key, requiring the user to simply actuating an actuator, e.g., depressing a button. The ignition switch may also be combined with a starter switch that activates the starter motor of the vehicle 10.

Because the ignition switch 50 may be responsible for providing power to the vehicle 10, the state of the ignition switch 50 may supersede other sources of input information to the wiper control module 34. Hence, if the ignition switch 50 is in an "off" state, then it may be assumed that the vehicle is being or has been powered down. In this circumstance, it may be unnecessary to check the status of the other sources of input information to the wiper control module 34, such as the speed sensor 48.

As indicated above, at least two different embodiments rely solely on information indicating vehicle engine ignition. In one embodiment, the wiper control module 34 automatically determines that the wipers 28R, 28L should be in the Park 1 position if the vehicle engine ignition is off, regardless of any data relating to vehicle movement. This embodiment is beneficial because the wipers 28R, 28L are maintained in the Park 1 position whenever the engine is off, which may facilitate removal of debris that may settle thereon over extended periods. For example, disposing the wipers 28R, 28L in the recess may make it easier to remove snow, ice, etc. that forms or otherwise covers the windshield, tops of the wipers 28R, 28L, etc.

In a different embodiment, the wiper control module 34 automatically determines that the wipers 28R, 28L should be in the Park 2 position if the vehicle engine ignition is off, regardless of any data relating to vehicle movement. This embodiment may be beneficial because it provides access to the wipers 28R, 28L in the Park 2 position whenever the engine is off, and thus the wipers 28R, 28L can be accessed by merely turning off the vehicle engine.

However, for both of these embodiments, if the vehicle ignition is on, then the wiper control module 34 can determine the proper wiper 28R, 28L position (Park 1 or Park 2) based on multiple inputs, i.e., sources of data relating to multiple different aspects of the vehicle 10, and in particular information sources indicating whether the vehicle 10 is moving or likely to move. In other words, the wiper control module 34 accesses secondary information from other vehicle input information sources to determine whether the vehicle 10 is moving or likely to move before deciding whether the wipers 28R and 28L should be docked in the Park 1 or Park 2 positions. This secondary information can be any other type of information disclosed herein, such as information provided by the sources disclosed below.

B. Parking Sensor(s)

Vehicle 10 may also be equipped with one or more parking sensors 54F in the front of the vehicle, and/or the rear of the vehicle (not shown). The sensors 54F in the front and rear of the vehicle may be distance detection elements, such as LED's, microwave or laser detection elements, or any other suitable element that sends signals to alert the vehicle's operator that an object or obstacle is near the vehicle 10. The front vehicle sensor(s) 54F and rear vehicle sensor(s) may be employed when the vehicle parks in either a forward or a reverse gear. The front sensor(s) 54F and rear sensor(s) may also be any other element capable of determining whether the vehicle 10 is on the verge of striking an object or obstacle. In addition or alternatively, these sensors can determine whether another object (such as another vehicle) is likely to collide with or otherwise contact the vehicle 10.

In some embodiments, these sensors may be mounted in either or both of the front or rear of the vehicle 10. The sensors may also detect objects or obstacles near the vehicle 10 when the vehicle 10 is emerging from a parked position. In some instances, these sensors may also be in use while the vehicle 10 is in motion to alert the vehicle's operator as to hazards near the vehicle 10 when the vehicle 10 is in motion. The front vehicle sensor(s) 54F and rear vehicle sensor(s) also need not be implemented via one of the aforementioned technologies, but may be any manner of sensor, such as a video motion detection engine.

The front vehicle sensor(s) 54F and rear vehicle sensor(s) may also be used to provide input information to the wiper control module 34, and may indicate whether the vehicle is in a parked position, such as in a garage, parking space, etc. For example, if a vehicle 10 pulls into a parking space, then the sensors may detect that the vehicle is in a parked position. This information may be stored in the wiper control module memory 40. If the speed of the vehicle 10 detected by the speed sensor 48 is then also detected as being indicative of a stationary vehicle condition (for example, a vehicle speed of 0 mph), and the wiper switch is in the "off" position, then the wiper control module 34 may make a decision to park the sensors in the Park 2 position. Alternatively, the wiper control module 34 may make this determination by communicating with any or all of the other vehicle components, such as by checking the status of the motor with the motor position sensor 38, or monitoring the status of the gear selector position sensor 46.

C. Speed Sensor(s)

The speed sensor(s) 48 may be any device capable of detecting the rate of change of the vehicle's 10 position with respect to time, e.g., the vehicle's speed. Some embodiments use odometer information, while other embodiments utilize a GPS system or signal to detect the speed of the vehicle 10. Still other embodiments detect the rate of rotation of the hub or other portions of one or more of the wheels 14, while others use inertial navigation.

The role of the speed sensor(s) 48 is to provide further evidence to the wiper control module 34 as to the vehicle's state of motion. For example, if the ignition switch 50 is in an on state, and the wiper control module 34 determines that the speed sensor 48 is reporting a non-zero velocity, then the vehicle 10 may be determined to be in motion. Accordingly, unless the wiper switch 44 has been activated by the vehicle's operator, then the wiper control module 34 may determine that the wipers 28R and 28L should be moved to the Park 1 position.

D. Motor Position Sensor(s)

FIG. 3 also illustrates at least one motor position sensor 38 that provides feedback information to the wiper control module 34. The motor position sensor 38 may use electromagnetic fields to determine whether the vehicle engine is in motion at any given time. The motor position sensor(s) 38 perform its function by detecting induced currents or electromagnetic fields from a motor in motion, by looking for Hall effect signatures, or any other technology capable of determining whether the motor is in motion, and in some instances the motor's degree of motion (e.g., fast or slow).

The motor position sensor(s) may operate under a similar principle as the ignition switch 50 sensor, because the motor may still be in motion when the vehicle 10 is parking or is parked, and so a state of dynamic motor activity detected by motor position sensor(s) may not be sufficient to move the wipers 28R, 28L to the Park 1 position. Thus, further information may need to be provided by the speed sensor 48 to confirm that the vehicle 10 is in motion before moving wipers 28R, 28L to the Park 1 position. However, if the motor position sensor(s) 38 detects that there is no dynamic motion occurring in the motor, then this information may cause the wiper control module 34 to park the wipers 28R, 28L in the Park 2 position, because this information provides a strong indication that the vehicle 10 is not in motion.

E. Gear Selector Position Sensor(s)

A further source of information to the wiper control module 34 includes information relating to the gear ratio currently selected in the transmission of the vehicle 10. In automatic, manual, and semi-automatic transmission systems, a gear selector position sensor 46 can provide digital and/or analog output signals that provide the wiper control module 34 with an indication of the sensed position of a transmission gear shift lever. For example, in the case of an automatic transmission, the signals may indicate that the gear shift lever is in "drive", or "park" position. Alternatively, in the case of a manual transmission, the signals may indicate that the transmission is in "third gear" or "neutral".

Similarly to some of the previously mentioned sources of input data to wiper control module 34, a gear selector position sensor 46 may not by itself be definitive to cause the wiper control module 34 to make a decision to move the wipers 28R, 28L to the Park 1 or Park 2 positions. For example, the fact that a certain gear of the transmission is engaged may not be sufficient evidence that that the vehicle 10 is in motion, which would warrant moving the wipers 28R, 28L to the Park 1 position. Instead, additional information may be required before moving the wipers 28R, 28L to the Park 1 position.

In addition, manual transmission vehicles may not have a "park" position, and may be parked in any gear, or no gear ("neutral"). However, at least in automatic transmission vehicles, a sensor indicating that the transmission is in the "parked" state may be strong evidence that the vehicle 10 is not in motion, even if the motor position sensor(s) 38 indicate that the motor is still running. Based on this information, the wiper control module 34 may make a decision to move the wipers 28R, 28L to the Park 2 position.

The disclosures provided above are merely provided for exemplary purposes. Embodiments are intended to include or otherwise cover any type of sensor(s) or inputs to determine the gear position.

F. Wiper Switch

The wiper switch 44 may be any device capable of actuating the wipers 28R, 28L for any reason. The wiper switch may have multiple setting options for different rates of periodic motion, such as fast, medium fast, medium, medium slow, and slow. However, the wiper switch 44 may also have more speed settings, less speed settings, or other settings as may be aperiodic, programmable, etc. The wiper switch 44 may be manually actuated to activate the wipers 28R, 28L to move once, i.e., to complete a single sweep cycle. For example, if a passing vehicle drives through water in the road, and the water strikes the windshield 24 obstructing the operator's view, then it may be beneficial to actuate the wipers 28R, 28L just once, or perhaps a few times until the obstruction has been cleared, as desired by the vehicle's operator. The wiper switch 44 may also have an option to dock the wipers 28R, 28L in either the Park 1 or Park 2 positions as desired by the operator.

The wiper switch 44 may supersede any of the other input information sources, because it is directly under the control of the vehicle's operator. For example, the user may activate the wipers 28R, 28L to cause the wipers 28R, 28L to move across the windshield, which overrides the position in which the wipers 28R, 28L had previously been disposed. In other words, the wipers 28R, 28L can only be in the Park 1 or Park 2 positions if the wiper switch 44 is not instructing the wiper motor 36 to move the wipers 28R, 28L.

Still further, the wiper switch 44 can enable the user to manually move the wipers 28R, 28L into either the Park 1 or Park 2 position. The wiper switch 44 can also have a setting to enable the wipers 28R, 28L to be automatically moved to the Park 1 or Park 2 positions based on information from any of the above sources.

Also, in some embodiments, the wiper switch 44 is not a physical wiper switch as disclosed above. As one example, some embodiments include a sensor (which may be mounted behind the vehicle windshield) to implement an automatic wiper operation. The wipers may be activated when the sensor senses water droplets on the windshield. This operation may be performed without human interaction. If the wiper switch is disposed to place the system in an automatic mode, then the wipers will only be activated if the sensor senses water droplets on the windshield, e.g., upon a request from the auto wiper sensor. In other words, the situation may arise where the wiper switch may be in an on state (in the sense of being in the automatic mode), but the wiper motor may not be activated (such as if the sensor does not sense water droplets on the windshield).

G. Motor

The wiper motor 36 may be used to actuate the wipers 28R, 28L so that they perform the function of swiping across the vehicle windshield 24 to move or remove foreign objects that can obstruct the driver's view. For example, the wiper control module 34 may send instructions to the wiper motor 36, such as to instruct the wiper motor 36 to either move the wipers 28R, 28L across the windshield 24, or alternatively to move the wipers 28R, 28L to either of the Park 1 or Park 2 positions. The motor may be any type of motor, i.e., a direct current (DC) motor or an alternating current (AC) motor, and may be single phase or three phase powered. The wiper motor 36 may also have brushes, or may be brushless.

In some embodiments, the motor can communicate or at least provide some indication of the state of the wipers 28R, 28L, such as their position. The wiper control module 34 may take the input information from the previously discussed information sources, and use the information to make a decision as to whether or not to actuate the wipers 28R, 28L, and if so, at which rate, and if not, whether to move the blades in the Park 1 or Park 2 positions.

V. Parking Control Algorithm

Figure 4:
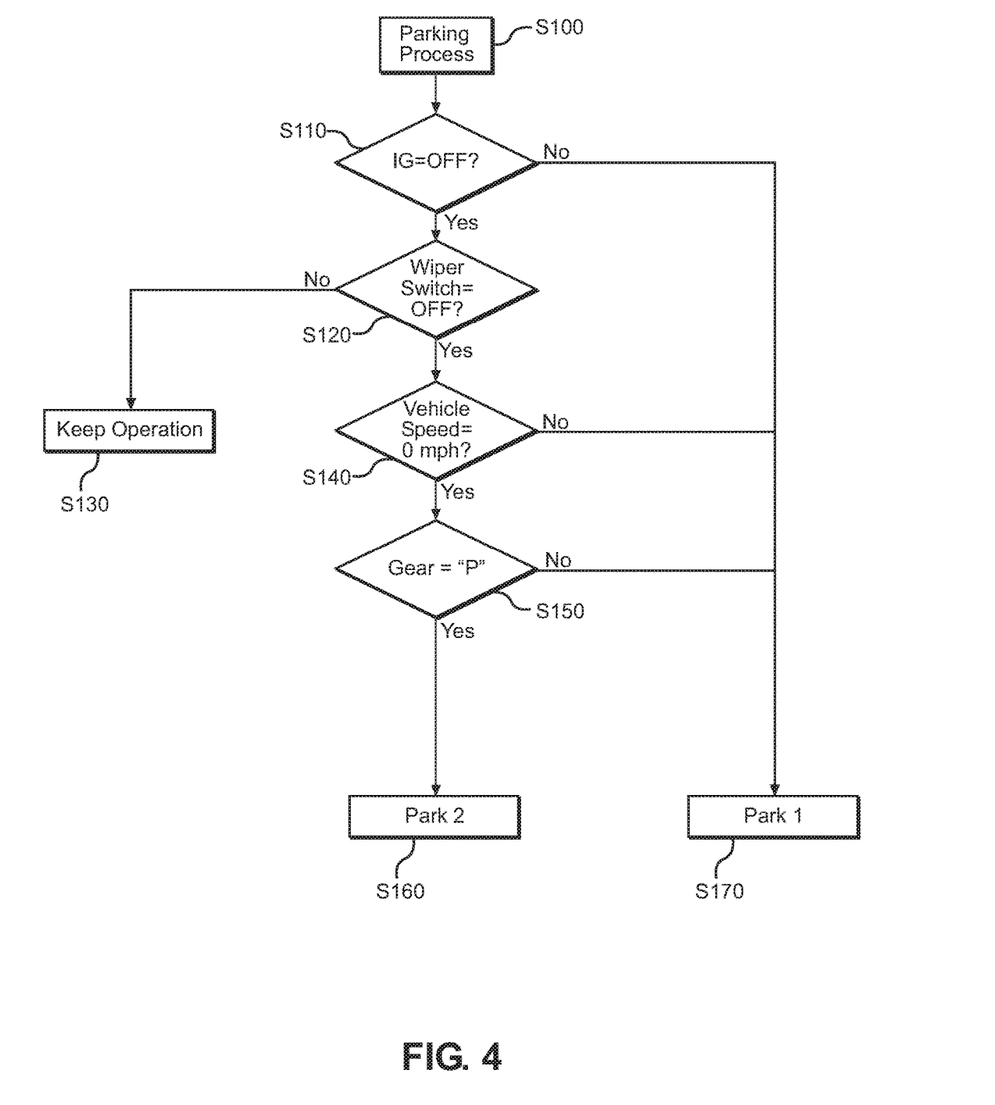
FIG. 4 is a flowchart of processes for automatically determining a proper wiper position, i.e., either a position (Park 1) or a service position (Park 2).

FIG. 4 is a flowchart of processes for automatically determining a proper wiper position, i.e., either a park position (Park 1) or a service position (Park 2). This process begins at step S100.

In step S110, the wiper control module 34 determines whether the ignition switch 50 is in an on or off position. If the ignition switch is in an "off" state (i.e., the ignition is not on), then the wiper control module 34 automatically moves the wipers 28R, 28L to the Park 1 position, which may serve to protect the wipers 28R, 28L. For example, the ignition may be off for long periods while the vehicle is not in use, and thus disposing the wipers 28R, 28L in the recess may help to protect the wipers 28R, 28L. It may also serve to facilitate removal of debris that may accumulate on the vehicle for these long periods while the vehicle is not in use. In other words, disposing the wipers 28R, 28L in the recess may make it easier to remove snow, ice, etc. that has accumulated on the windshield. If the ignition switch 50 is in an "on" state, then the wiper control module 34 proceeds to step S120.

In step S120, the wiper control module 34 determines whether the wipers 28R, 28L are in use by the vehicle 10. This determination may be made by monitoring the state of the wiper switch 44 to ascertain whether the operator has physically activated the wipers 28R, 28L. If it is determined that the operator has activated the wipers 28R, 28L (i.e., wiper switch 44 is in an "on" state), then the wiper control module 34 proceeds to step S130, which can be characterized as a "keep operation" state. In this state, the wiper control module 34 does not cause a change in the parking position of the wipers 28R, 28L, and also the wiper control module 34 does not change any other aspect of the wipers 28R, 28L. In other words, if the wipers 28R, 28L are currently in use, then that operation is maintained and the wipers 28R, 28L are not moved to either of the Park 1 or Park 2 positions. If the operator has not activated the wiper switch 44, i.e., the wiper switch 44 is off, then the wiper control module 34 proceeds to step S140.

However, as discussed above, some embodiments include a sensor to implement an automatic wiper operation, wherein the wipers may be activated when the sensor senses water droplets on the windshield. If the wiper switch is disposed to place the system in an automatic mode, then the wipers will only be activated if the sensor senses water droplets on the windshield, e.g., upon a request from the auto wiper sensor. Thus, the situation may arise where the wiper switch may be in an on state (in the sense of being in the automatic mode), but the wiper motor may not be activated (such as if the sensor does not sense water droplets on the windshield). However, in many of these embodiments, the wiper control module 34 still only proceeds to step S140 if the switch is not in an on state (i.e., automatic mode). For example, the wipers 28R, 28L are treated as being in use (and not moved to the P2 position) if the switch is in the automatic mode, to avoid a situation where the wipers may move (such as upon the sensor sensing water droplets on the windshield) while the wiper blades are being changed.

In step S140, the wiper control module 34 determines whether the vehicle is physically in motion. This determination may be made by monitoring the speed sensor(s) 48 and checking to determine whether the vehicle 10 is moving at a rate of 0 mph (i.e., whether the vehicle 10 is stopped). If the vehicle 10 is moving at some speed above 0 mph, then the wiper control module 34 automatically places wipers 28R, 28L in the Park 1 position. However, if the vehicle 10 is not in motion, (speed=0 mph), then the wiper control module 34 proceeds to step S150.

In step S150, the wiper control module 34 determines the gear in which the vehicle 10 is currently engaged. This determination may be accomplished by examining the state of the gear selector position sensor 46. If the sensor 46 determines that the transmission is in the parked position, then the wiper control module 34 makes a decision to park the wipers 28R, 28L in the Park 2 position. However, if the transmission is not in a parked position, then the wiper control module 34 makes a decision to park the wipers 28R, 28L in the Park 1 position. In other words, the vehicle control module 34 determines that the vehicle 10 is likely to move.

However, as disclosed above in Section IV.E., the disclosed embodiments cover both automatic and manual transmissions. Thus, in the context of manual transmissions, a sensor can be provided to determine whether the manually selected position corresponds to a position that is appropriate (under the conditions discussed above) for the vehicle to be stationary with the engine ignition in the on state, which will typically be the neutral position. For example, if the manual transmission is in neutral (and the other conditions apply that are discussed above), then the vehicle control module 34 may make a decision to park the wipers 28R, 28L in the Park 2 position.

VI. Alternative Embodiment of FIG. 5

Figure 5:
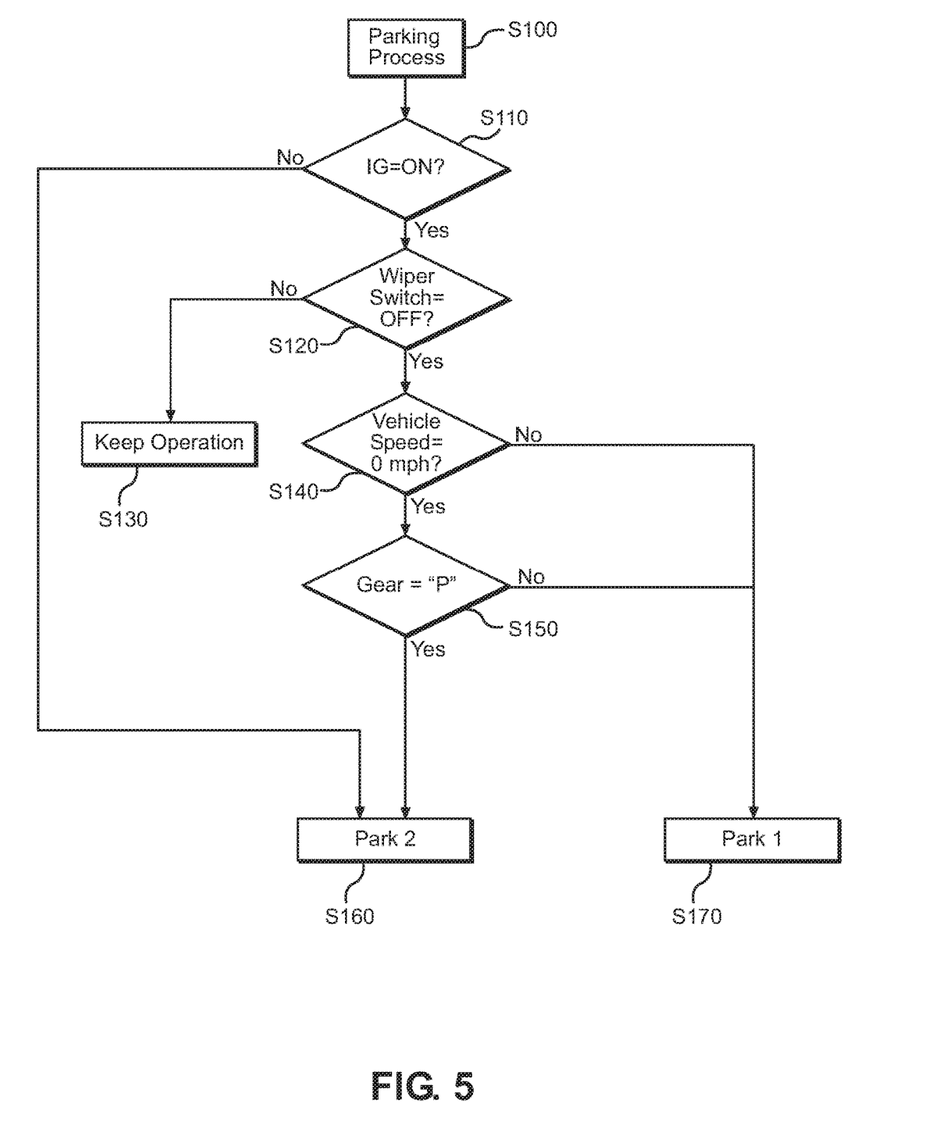
FIG. 5 is a flowchart of alternative processes for automatically determining a proper wiper position, i.e., either a position (Park 1) or a service position (Park 2).

FIG. 5 is a flowchart of alternative processes for automatically determining a proper wiper position, i.e., either a position (Park 1) or a service position (Park 2). The processes of FIG. 5 are identical to those of FIG. 4, except as discussed below.

FIG. 5 is directed to the alternative embodiment relating to the engine ignition condition. Specifically, in accordance with the embodiment of FIG. 5, the wiper control module 34 automatically determines that the wipers 28R, 28L should be in the Park 2 position if the vehicle engine ignition is off, regardless of any data relating to vehicle movement. This embodiment may be beneficial because it provides access to the wipers 28R, 28L in the Park 2 position whenever the engine is off, and thus the wipers 28R, 28L can be accessed by merely turning off the vehicle engine.

In particular, in step S110, the wiper control module 34 determines whether the ignition switch 50 is in an on or off position. If the ignition switch is in an "off" state (i.e., the ignition is not on), then the wiper control module 34 automatically moves the wipers 28R, 28L to the Park 2 position, which may serve to protect the wipers 28R, 28L. If the ignition switch 50 is in an "on" state, then the wiper control module 34 proceeds to step S120. The processes continue as disclosed above with regard to FIG. 4.

VII. Other Alternative Embodiments

While certain embodiments of the invention are described above, and FIGS. 1-5 disclose the best mode for practicing the various inventive aspects, it should be understood that the invention can be embodied and configured in many different ways without departing from the spirit and scope of the invention.

The embodiments are disclosed above in the context of an automobile. However, embodiments are intended to be applicable to any type of vehicle, such as any vehicle that travels on land, water, air, space, etc.

The embodiments disclosed above include two different parked positions, i.e., a Park 2 position providing access to the wipers 28R, 28L, and a Park 1 position in which the wipers 28R, 28L are hidden, such as to provide enhanced aerodynamics. However, embodiments are intended to cover other systems that park the wipers 28R, 28L in two different locations and/or orientations for reasons other than those disclosed above. In fact, embodiments are intended to cover systems that provide more than two different parked positions for wipers 28R, 28L.

The vehicle 10 of FIGS. 1 and 2 can also include a mechanical wiper control module 34 that includes, or is solely composed of, a purely mechanical or purely electrical wiper control module 34, as opposed to the electromechanical wiper control module 34 disclosed above. The mechanical wiper module 34 may make decisions to park the wipers 28R, 28L in any of the aforementioned positions, and may work on the foundation of mechanical assemblies that employ elements, such as such as motors, gears, etc.

In addition, the disclosed subject matter is intended to encompass embodiments that employ algorithms different from the algorithm depicted in FIG. 4. For example, the wiper control module 34 may take additional inputs from any other vehicle component, such as from front vehicle sensor(s) 54F and/or the rear vehicle sensor(s). The vehicle control module 34 may also provide different priorities to different sources of input information when determining where to park the wipers 28R, 28L, or whether to leave the position or state of operation of wipers 28R, 28L alone. These algorithms may include, for example, checking the status of the gear selector position sensor 46 prior to or without checking the status of the ignition switch 50, or checking the vehicle speed via speed sensor 48 before checking the position of ignition switch 50.

In some embodiments, the wiper control module 34 may use a completely different paradigm when deciding which commands, if any, are dispatched to the wipers 28R, 28L, such as performing a statistical poll of the various vehicle components to make a correlated decision. For example, an intelligent vehicle entry system can determine the location of a key FOB, and take appropriate action if certain parameters exist where the key FOB is located in the vicinity indicative of wiper maintenance, i.e., near the A pillar. One action that can be taken is to move the wipers to the Park 2 service position if the key FOB is determined to be in a location indicative of wiper maintenance. In other words, the present disclosure contemplates using the input for the algorithm to place the wipers in Park 2 position for servicing when the key FOB is in a certain area of the vehicle that indicates that it is the user's intention to service the wipers.

The vehicle parking sensor(s) 54F need not be installed on the vehicle's fenders 60, and instead may be positioned anywhere on or around the vehicle, such as on the vehicle hood 30 or the vehicle undercarriage (not shown). The vehicle 10 may also have sensors attached to the top or sides of the vehicle body 12. In fact, any of the components of vehicle 10 may be located anywhere on or in the vehicle 10.

The wiper control module processor 34 can be connected for communication with each of the sensors 38, 44, 46, 48, 50, 54R,F in any appropriate manner. Electrical communication can be either one-way communication or two-way communication and can be networked or not networked. The processor 34 also can be referred to as an electronic control unit (ECU) or as a central processing unit. The sensors 38, 44, 46, 48, 50, 54R,F can be configured with hardware, with or without software, to perform the assigned task(s). The sensors 38, 44, 46, 48, 50, 54R,F can be configured as a smart sensor such that the sensors 38, 44, 46, 48, 50, 54R,F can process the raw data collected by the sensors 38, 44, 46, 48, 50, 54R,F prior to transmission to the processor 34 or the sensors 38, 44, 46, 48, 50, 54R,F can be configured as a simple sensor that passes the raw data directly to the processor 34 without any manipulation of the raw data. The sensors 38, 44, 46, 48, 50, 54R,F can be configured to send data to the processor 34, with or without a prompt from the processor.

The present disclosure also contemplates an embodiment where the Park 2 position can be activated by actuating an actuator, such as by pressing a button disposed in the vehicle, or by actuating an actuator on the key FOB (such as via a button press sequence), to override the algorithm. This procedure may be used to enter into the service mode, or alternatively may be used to move ice or snow when ice or snow collects between the hood and windshield.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

Embodiments are also intended to include or otherwise cover methods of using and methods of manufacturing any or all of the elements disclosed above. The methods of manufacturing include or otherwise cover processors and computer programs implemented by processors used to design various elements of the vehicle wiper assembly disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A control system for use with a wiper motor that is configured to move a wiper over a vehicle exterior surface partially defining a recess for the purpose of contacting and thereby moving an object disposed thereon, the control system comprising:

an actuator that is actuable into an on state such that the actuator instructs the wiper motor to move the wiper over the vehicle exterior surface;

a processor-based controller that instructs, when the actuator is not actuated into the on state, the wiper motor to move the wiper to either a Park 1 position on the vehicle exterior surface within the recess that provides enhanced aerodynamic effects or a different Park 2 position on the vehicle exterior surface exposed from the recess that provides enhanced accessibility to the wiper; and an ignition switch that provides an indication to the processor-based controller as to whether an engine of the vehicle is in an ignition on or an ignition off condition, the processor based controller being configured to receive vehicle speed data and transmission status, the processor-based controller being configured to instruct the wiper motor to move the wiper to the Park 1 position if the ignition switch is in the ignition on condition and one of the vehicle speed data and the transmission status is different from a respective one of zero and a predetermined transmission status, the processor-based controller also being configured to instruct the wiper motor to move the wiper to the Park 2 position if the ignition switch is in the ignition off condition, and the processor-based controller also being configured to instruct the wiper motor to move the wiper to the Park 2 position if the ignition switch is in the ignition on condition, the vehicle speed data is equal to zero, and the transmission status is equal to the predetermined transmission status.

2. The control system according to claim 1, wherein the indication provided by the ignition switch that the vehicle engine is in an ignition off condition takes priority over the indication as to whether the vehicle is moving.

3. The control system according to claim 2, wherein the indication provided by the ignition switch that the vehicle engine is in the ignition off condition takes priority over the actuator being actuated into the on state, such that the processor-based controller instructs the wiper motor to move the wiper to the Park 2 position if the ignition switch indicates that the vehicle engine is in the ignition off condition, even if the actuator instructs the wiper motor to move the wiper over the vehicle exterior surface.

4. The control system according to claim 3, further comprising a speed sensor configured to communicate vehicle speed data to the processor-based controller if the ignition switch indicates that the vehicle engine is in an ignition on condition.

5. The control system according to claim 4, wherein the processor-based controller instructs the wiper motor to move the wiper to the Park 2 position if the processor-based controller determines that the vehicle speed data is indicative of a stationary vehicle condition.

6. The control system according to claim 5, further including a gear position sensor that is configured to detect the status of the transmission of the vehicle including whether the transmission is in a parked state, the gear position sensor also being configured to communicate the detected transmission status to the processor-based controller if the speed sensor determines that the vehicle speed data is indicative of a stationary vehicle condition.

7. The control system according to claim 6, wherein the processor-based controller instructs the wiper motor to move the wiper to the Park 2 position if the gear position sensor communicates to the processor-based controller that the transmission is in the parked state.

8. The control system according to claim 1, wherein the Park 1 position constitutes a position where the wiper is disposed in the recess and the recess is defined between an end of a hood of the vehicle and a base of a windshield of the vehicle.

9. The control system according to claim 8, wherein the Park 2 position constitutes a position where the wiper is disposed so as to contact a surface of the windshield above the recess.

10. A vehicle wiper assembly that is configured to contact and thereby move an object disposed on a vehicle exterior surface that partially defines a recess, the vehicle wiper assembly comprising:

a wiper configured to be disposed in contact with the vehicle exterior surface;

a wiper motor that is configured to move the wiper over the vehicle exterior surface; and a control system for providing instructions to the wiper motor to direct movement of the wiper, the control system including:

an actuator that is actuable into an on state such that the actuator instructs the wiper motor to move the wiper over the vehicle exterior surface;

a processor-based controller that instructs, when the actuator is not actuated into the on state, the wiper motor to move the wiper to either a Park 1 position on the vehicle exterior surface within the recess that provides enhanced aerodynamic effects or a different Park 2 position on the vehicle exterior surface exposed from the recess that provides enhanced accessibility to the wiper; and an ignition switch that provides an indication to the processor-based controller as to whether an engine of the vehicle is in an ignition on or an ignition off condition, the processor based controller being configured to receive vehicle speed data and a status of a transmission of the vehicle, the processor-based controller being configured to instruct the wiper motor to move the wiper to the Park 1 position if the ignition switch is in the ignition on condition and one of the vehicle speed data and the transmission status is different from a respective one of zero and a predetermined transmission status, the processor-based controller also being configured to instruct the wiper motor to move the wiper to the Park 2 position if the ignition switch is in the ignition off condition, and the processor-based controller also being configured to instruct the wiper motor to move the wiper to the Park 2 position if the ignition switch is in the ignition on condition, the vehicle speed data is equal to zero, and the status of the transmission is equal to the predetermined transmission status.

11. The vehicle wiper assembly according to claim 10, wherein the indication provided by the ignition switch that the vehicle engine is in an ignition off condition takes priority over the indication as to whether the vehicle is moving.

12. The vehicle wiper assembly according to claim 10, wherein the indication provided by the ignition switch that the vehicle engine is in the ignition off condition takes priority over the actuator being actuated into the on state, such that the processor-based controller instructs the wiper motor to move the wiper to the Park 2 position if the ignition switch indicates that the vehicle engine is in the ignition off condition, even if the actuator instructs the wiper motor to move the wiper over the vehicle exterior surface.

13. The vehicle wiper assembly according to claim 12, further comprising a speed sensor being configured to communicate vehicle speed data to the processor-based controller if the ignition switch indicates that the vehicle engine is in an ignition on condition.

14. The vehicle wiper assembly according to claim 13, wherein the processor-based controller instructs the wiper motor to move the wiper to the Park 2 position if the processor-based controller determines that the vehicle speed data is indicative of a stationary vehicle condition.

15. The vehicle wiper assembly according to claim 14, further including a gear position sensor that is configured to detect the status of the transmission of the vehicle including whether the transmission is in a parked state, the gear position sensor also being configured to communicate the detected transmission status to the processor-based controller if the speed sensor determines that the vehicle speed data is indicative of a stationary vehicle condition.

16. The vehicle wiper assembly according to claim 15, wherein the processor-based controller instructs the wiper motor to move the wiper to the Park 2 position if the gear position sensor communicates to the processor-based controller that the transmission is in the parked state.

17. The vehicle wiper assembly according to claim 10, wherein the Park 1 position constitutes a position where the wiper is disposed in the recess and the recess is defined between an end of a hood of the vehicle and a base of a windshield of the vehicle; and wherein the Park 2 position constitutes a position where the wiper is disposed so as to contact a surface of the windshield above the recess.

18. A method of controlling a wiper motor that is configured to move a wiper over a vehicle exterior surface that partially defines a recess for the purpose of contacting and thereby moving an object disposed thereon, the method comprising:
if an actuator is not actuated into a state that would otherwise instruct the wiper motor to move the wiper over the vehicle exterior surface, instructing, with a processor, the wiper motor to move the wiper to either a Park 1 position that provides enhanced aerodynamic effects, or a different Park 2 position that provides enhanced accessibility to the wiper;
determining, with the processor, one of an ignition on condition and an ignition off condition;
comparing, with the processor, vehicle speed data to zero;
comparing, with the processor, a status of a transmission of the vehicle with a predetermined transmission status;
instructing, with the processor, the wiper motor to move the wiper to the Park 1 position on the vehicle exterior surface within the recess if the processor determines the ignition on condition and that one of the vehicle speed data and the transmission status is different from a respective one of zero and a predetermined transmission status;
instructing, with the processor, the wiper motor to move the wiper to the Park 2 position on the vehicle exterior surface exposed from the recess if the processor determines the ignition off condition; and
instructing, with the processor, the wiper motor to move the wiper to the Park 2 position if the processor determines the ignition on condition, the processor determines that the vehicle speed data is equal to zero, and the processor determines that the status of the transmission is equal to the predetermined transmission status.

* * * * *